Dec. 9, 1924.

J. W. OWEN ET AL 1,518,443

SOUND RECORD AND PROCESS OF MAKING THE SAME

Original Filed July 28, 1915   5 Sheets-Sheet 1

INVENTORS
James W. Owen.
Albertis Hewitt.

WITNESSES

BY

ATTORNEYS

Dec. 9, 1924.
J. W. OWEN ET AL
SOUND RECORD AND PROCESS OF MAKING THE SAME
Original Filed July 28, 1915   5 Sheets-Sheet 2
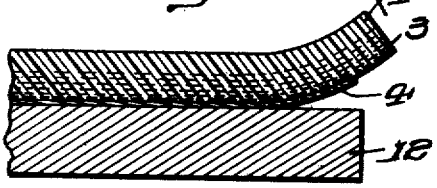
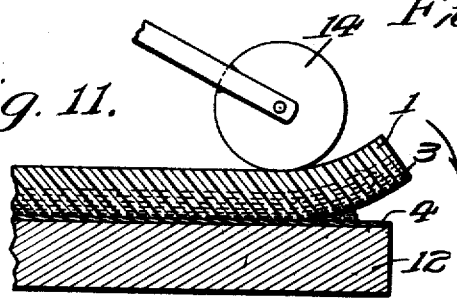
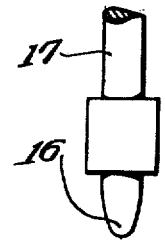
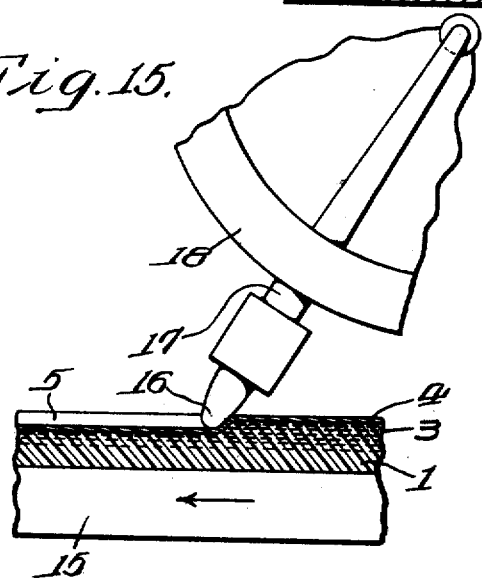
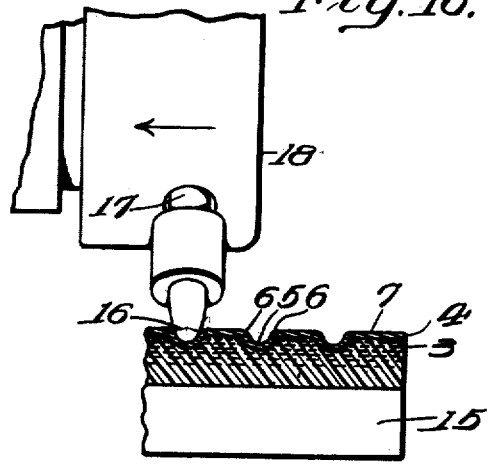
INVENTORS
James W. Owen.
Albertis Hewitt.
WITNESSES
BY
ATTORNEYS

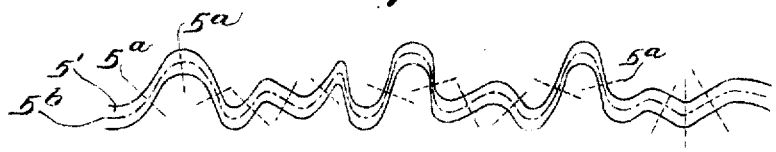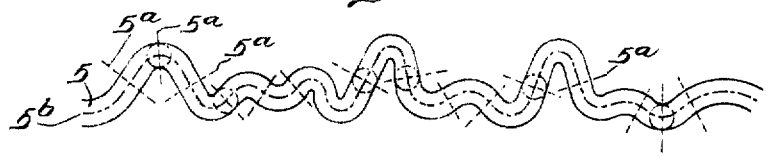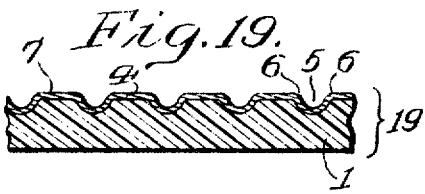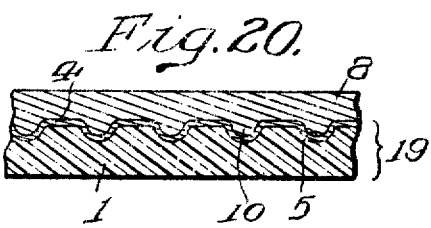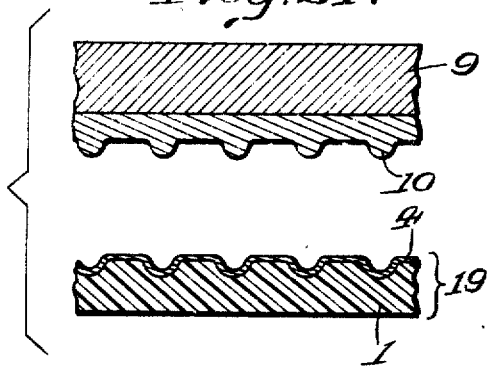

Dec. 9, 1924.  1,518,443
J. W. OWEN ET AL
SOUND RECORD AND PROCESS OF MAKING THE SAME
Original Filed July 28, 1915   5 Sheets-Sheet 4

Dec. 9, 1924.

J. W. OWEN ET AL 1,518,443

SOUND RECORD AND PROCESS OF MAKING THE SAME

Original Filed July 28, 1915   5 Sheets-Sheet 5

INVENTORS
James W. Owen.
Albertis Hewitt

WITNESSES

BY

ATTORNEYS

Patented Dec. 9, 1924.

1,518,443

UNITED STATES PATENT OFFICE.

JAMES W. OWEN, OF SECANE, PENNSYLVANIA, AND ALBERTIS HEWITT, OF CAMDEN, NEW JERSEY, ASSIGNORS TO VICTOR TALKING MACHINE COMPANY, A CORPORATION OF NEW JERSEY.

SOUND RECORD AND PROCESS OF MAKING THE SAME.

Application filed July 28, 1915, Serial No. 42,285. Renewed May 2, 1924.

*To all whom it may concern:*

Be it known that we, JAMES W. OWEN, a citizen of the United States, and a resident of Secane, in the county of Delaware, State of Pennsylvania, and ALBERTIS HEWITT, a citizen of the United States, and a resident of Camden, in the county of Camden, State of New Jersey, have invented certain new and useful Improvements in Sound Records and Processes of Making the Same.

Our invention particularly relates to the methods and processes of making records such as are used directly with or in connection with sound reproducing machines, such as talking machines, graphophones, gramophones, phonographs and the like, and to the various records of sound formed by or during the operation or performance of the method or process of making records of sound, such as the original or master records, the negatives or matrices formed therefrom or thereby and the commercial records adapted for use in connection with sound reproducing machines of the general types.

Our invention also relates to the method of recording original master records of sound, and particularly to that type or kind of recording in which the original record of sound is in the form of a groove extending in a generally spiral direction on the face or a disc or around the periphery of a cylinder, which groove has in the walls thereof, undulations corresponding to sound waves, and while our invention has particular reference to the production of commercial records of sound in which the spiral record groove is in a face of a disc and the sound groove itself is of substantially even depth, or gradually increasing or decreasing depth, with the undulations corresponding to sound waves in the side walls thereof, our invention is not strictly limited to the production of that class of records, or to the methods by which that class of records is originally recorded and duplicated, as the formation of a record groove in which the bottom wall or lowest portion of the groove contains the undulations corresponding to sound waves may be produced by the method and in the manner indicated in the specification and claims of this application.

The objects of our invention are to produce a record of sound in which the undulations in the walls of the groove thereof correspond more faithfully and truly to the vibrations of sound waves originally impressed upon the diaphragm of the recording mechanism; to produce a record pressing matrix which is more nearly a perfect negative of the original or master record than has heretofore been produced; to produce a master record which will permit of the production, directly from the surface thereof, of a relatively large number of record pressing matrices, without substantial injury to or deterioration of the original or master record; to eliminate the necessity of depending upon the first matrix formed from the original or master record for subsequent duplicates of the said original or master record; to produce an original or master record blank which offers the least possible resistance to the free and untrammeled vibration of the recording stylus; to provide a master record blank in which whatever resistance is offered to the vibration of the recording stylus, is substantially absolutely uniform and unvarying, irrespective of the direction in which the stylus may move with respect thereto; to provide an original or master record blank in which the record of sound may be substantially made in a mobile or in a compressible medium; to provide a master record blank in which the original record of sound may be formed in a medium which of itself will not permanently retain the impression or indentation formed by the recording stylus; to produce an original or master gramophone record directly in metal or in a metallic surface, or a facing of a master sound record blank; to produce, in a master gramophone record, a laterally undulatory groove having undulations corresponding to sound waves in the side walls thereof, which groove is of substantially uniform and even depth and of substantially uniform and even width throughout the full length of the record groove; to produce a gramophone record in which there is no substantial variation in the width or depth of the laterally undulatory groove; to produce a gramophone record blank which may be used with a recording stylus of hard material which will not wear during the recording of a large number of master records; to produce a gramophone sound record blank in which the same recording stylus may be used to record a large number of master records and to thus insure a uniformity in the width of the record groove of a large number of records of different selections, thus substantially standardizing the depth and width of the record grooves of different records; and to form the groove of an original or master record in a thin pliable and impressible sheet of material supported upon a yielding or mobile or plastic or fluid or compressible medium.

Further objects are to produce an original or master record of any type, and also commercial records therefrom, in which the sharp edges usually existing between the side walls of the record groove and the surface in which the groove is formed, are eliminated and rounded edges or corners are formed in lieu thereof, and to form an sub-original or master record of sound, by substantially compressing the material underneath and at the sides of the recording stylus, as distinguished from merely indenting or displacing the said material; to impress a groove, having undulations therein, corresponding to sound waves, directly into a master record blank by the tip of the recording stylus; to produce a gramophone or other master record, or a record formed from said master record in which the record groove may gradually and evenly increase or decrease in depth longitudinally of the groove; to produce a master record blank in which any substantial vertical displacement of material at the sides of the record groove, while the said groove is being formed in the surface of said blank by a recording stylus is prevented, and in which the material may be substantially compressed by the recording stylus, as distinguished from displaced; to form an original or master record in a medium, the mobility or the yielding character or fluidity or plasticity of which may be such as not to retain of itself the impression formed therein by the recording stylus; to produce a commercial record in which a reproducing stylus is free to rest upon the bottom of the groove without engagement with the upper parts of the side walls of the record groove; to produce a groove in an original master record and in the commercial record formed therefrom which is much more smooth and free from scratches, scales and irregularities than is ordinarily produced by the usual or well known methods of processes of recording; to eliminate, to a great extent, during the reproduction of sound from a commercial record the scratching and hissing noises foreign to the sounds recorded in the walls of the record groove, and due in the main to minute scratches, scales and irregularities in the bottom walls of the record groove; to produce a commercial record which is less subject to wear by reason of engagement of the reproducing point therewith than are records produced through the usual and well known process of making commercial records.

Other objects of our invention will appear in the specification and claims below.

In the accompanying drawings forming a part of the specification and in which the same reference numerals are employed to designate the same parts throughout the various views, Figs. 1 to 3 indicate diagrammatically and in general, the method of making the sound record blank; Fig. 4 the master record formed from said blank; Figs. 5 and 6 the method of duplicating the master record and obtaining therefrom a master matrix, and Fig. 7 the commercial record formed from the master matrix shown in Fig. 6. These figures, 1 to 7, inclusive, indicate in general the method, process and articles forming the subject-matter of this invention.

In Figs. 8 to 13 is indicated one way in which the method or process of forming a master record blank pursuant to the invention of this application may be carried out, and in Fig. 13 is particularly shown a portion of a master record blank produced by the said process.

In Fig. 14 is shown on an enlarged scale, a stylus such as may be used in carrying out the invention of this application.

In Figs. 15 and 16 is illustrated, diagrammatically, the manner in which the record groove is formed in the master record.

In Fig. 17 is indicated, diagrammatically, and on a greatly enlarged scale, the variations which may occur in the width of a record groove of a master record blank formed in the common method of cutting a groove in a master record blank, and in Fig. 18 is similarly indicated a record groove of the same sound as that shown in Fig. 17, but the said groove is formed in accordance with the invention of this application. This groove is, however, of the same or uniform width transverse to the median line of the groove at any particular point throughout the entire length of the same.

In Figs. 19 to 21 inclusive are shown the steps by means of which a master matrix is obtained from the master record and in Fig. 22 is shown the commercial record formed from the matrix illustrated in Fig. 21.

Fig. 23 shows a modified master record produced by the performance of the steps of this invention and Fig. 24 shows a further modification of the master record shown in Fig. 19.

Fig. 25 shows on a reduced scale a modified flexible indentible or impressible sheet or plate such as may be used in the master record shown in Fig. 23, but the thickness of the said sheet is exaggerated for the purpose of clearness.

Figure 1:
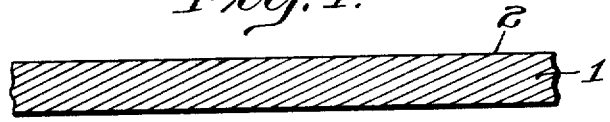

Figs. 26 to 31 inclusive illustrate a slightly modified method of producing a master record in accordance with the invention of this application.

Figs. 32 to 37 illustrate a further modification of the process of making a master record.

It is to be understood that the figures of the drawings are all more or less diagrammatic; that is to say, the relative sizes and proportions of certain of the parts are enlarged and exaggerated with respect to other parts for the purpose of clearly bringing out the features of the invention. Thus, in actual practice, the commercial record itself will be, generally speaking, only about one eighth of an inch in thickness, while the diameter of it may vary, generally speaking, from six to twelve inches. The record groove is obviously shown in the drawings on a greatly enlarged scale for the sake of clearness in illustration. It is therefore to be understood that the drawings are not exact representations of the records formed by the exercise of the invention of this application, but that they show in a more or less diagrammatic manner the essential and important details of the same.

Figure 2:
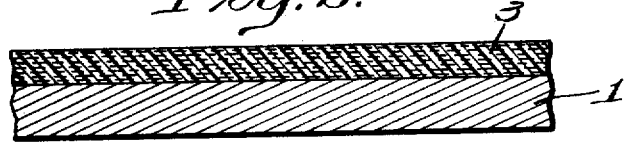

Referring first to Figs. 1 to 7, in Fig. 1 is shown a disc or base 1 of suitable material upon one surface of which, as for example on the surface 2 of the disc 1, is formed or supported a layer 3 of soft material as illustrated in Fig. 2. This material may either be a layer of soft material applied thereto in any suitable manner, as by coating, painting or flowing a suitable material thereover, or the softened surface of the disc or blank 1, as hereinafter referred to. This layer of soft material may be either plastic, semi-plastic or fluid, or it may be temporarily plastic, semi-plastic or fluid. It is important, however, that the material comprising the layer 3 remain in a soft or yielding or compressible condition at least until after the record groove is formed therein.

Figure 3:
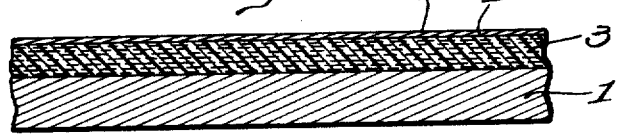

Over the top surface of the layer 3 of soft material is then formed or placed a thin layer or sheet 4 of pliable, or indentible or impressible material having a very smooth polished upper surface, as shown in Fig. 3. This thin layer 4 rests upon and is supported by the layer 3 of soft material. This thin layer 4 of impressible material may be formed in a variety of ways and may be of a variety of materials and may be placed thereon in a variety of ways, and the preferred manner of forming the thin layer 4 of pliable or impressible material and applying it to the layer 3 of soft material will be set forth below. This thin layer 4 of pliable material may be a layer of pliable, impressible varnish, or it may be a film formed out of the same material as that of the soft material 3, as for instance, by allowing the layer 3 to be exposed to the air for a suitable length of time until a pliable and indentible or impressible crust or shell or skin forms on the top of it. Such a crust, shell or skin may also be formed by pouring upon the smooth plate 1 a mixture of linseed oil and wax melted together, to which a suitable filler such as lamp black has been added. When so formed on a plate a natural skin, crust or shell 4 forms over the exposed surface of the mixture on account of the rapid oxidation of the oil. The crust, skin or shell so formed is pliable and indentible, and will retain an impression formed therein. The said crust, skin, shell or film will be supported upon the layer 3 of soft, or compressible unoxidized material, as the crust, skin, shell or film as formed over this mixture of waxes and oil protects the material enclosed thereby and acts to prevent the oxidation or further changing of the material so protected. The thin layer 4, however, may be and preferably is a thin sheet of metal, such as copper, nickel, aluminum, gold leaf, silver leaf, or similar materials, laid upon and supported by the layer 3 of soft material.

Preferably, though not necessarily, the material forming the layer 3 should be of a substantially compressible material; that is to say, a material which, under pressure, may be reduced in volume, such, for instance, as soft or simi-plastic celluloid.

Fig. 3 shows diagrammatically, a complete and finished master record blank, comprising a base 1 of suitable solid supporting material, a layer 3 of soft yielding, mobile and preferably compressible material, upon which is supported a thin skin or layer 4 of pliable, impressible, indentible material.

Figure 4:
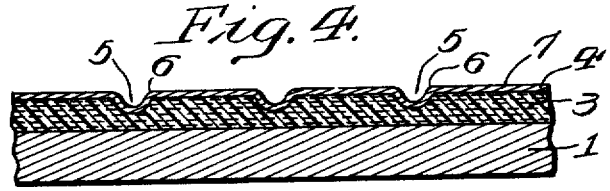

The next step in the process is that of forming the record groove in the record blank. This is accomplished by putting the record blank upon a suitable revolving turntable, or support, and bringing into engagement with the surface thereof, a recording tool or stylus arranged to be vibrated from a diaphragm which is responsive to impulses produced by sound waves and causing a slow relative transverse movement between the end of the stylus and the master record blank, thus forming a sound record groove having a continuous generally spiral form in the face of the master record blank. The stylus rests with a suitable amount of pressure upon the surface of the layer 4 of this pliable, impressible, indentible material, and bends the surface of said thin layer 4 directly beneath the end of the stylus down to form a groove 5, and as the stylus is vibrated under the influence of sound waves striking against the diaphragm, forms in the side walls of the record groove 5, lateral undulations corresponding to sound waves. In bending downwardly that portion of the surface of the thin layer 4 of pliable material under the weight imposed thereupon through the stylus by the recording mechanism, the edges 6—6 of the sound groove 5 will be rounded over slightly as shown in Fig. 4, due to the bending or drawing of the pliable material out of the plane of the top surface 7 and the formation of sharp or rough edges between the intersections of the side walls of the record groove 5, and the said top surface 7 of the layer or skin 4 will be avoided. The layer or skin 4 should be of sufficient stiffness or rigidity to retain the shape into which it is bent and indented or impressed by the recording stylus, even though the supporting medium or layer 3 of soft material of itself is too mobile or too plastic or too fluid to permanently retain the shape into which it is forced or compressed by the recording stylus. It will thus be seen that the layer 3 of soft material, if fluid, or very soft or plastic, may be displaced by the recording stylus through the thin skin 4, and retained in such displaced position by the thin layer 4 of pliable material. If the material forming the layer 3 of soft material be a substantially compressible material, such, for example as is approximated in softened celluloid, that portion of the layer 3 of soft material adjacent the indentations in the thin layer or skin 4 will be substantially condensed and compressed and the thin layer or skin 4 will remain in engagement therewith. In Fig. 4 is shown a master record blank immediately after the record of sound has been recorded therein with the material of the layer 3 so compressed immediately under the groove 5 forming the record.

The recorded record blank, which is the master record shown in Fig. 4, may be duplicated in a number of ways. The material of the layer 3 may be of such a character that it will set or harden, in which event the master record may be allowed to stand for a sufficient length of time to produce a permanent master record. The layer 3 of soft material may, however, be of such a character that it will not set or harden, or the setting or hardening of the same may be prevented, by suitable means, all of which will be referred to below.

A master matrix may be next formed from the said master record shown in Fig. 4. This master matrix is preferably formed by electroplating the top or recorded surface of the master record shown in Fig. 4, then stripping the electroplate from the said master record and then backing up the electroplate with a relatively stiff plate. If the material of the thin skin or layer 4 be of a material which is a non-conductor of electricity, such as wax, the surface 7 may be first coated with a very thin layer of graphite, or other comminuted electrically conductive material. This may be applied to the surface as a powder with a camel's hair brush. If the skin or layer 4 be of aluminum, the electroplate may be formed directly thereon, because electrodeposited metal will not attach itself to aluminum so firmly that it can not be readily separated therefrom. If, however, the thin skin or layer 4 be of copper, nickel, silver, gold, or generally speaking, any other metal than aluminum, the top surface 7 may be first treated in any suitable manner to prevent the electrodeposit from adhering so firmly thereto that it can not be readily or safely stripped therefrom. If the thin layer or skin 4 be of copper, nickel, or generally speaking any metal other than aluminum, the surface 7 may be oxidized in any well known way, or it may be subjected to any suitable treatment to produce a film or surface upon the metal, which is conductive of electricity and will take an electrodeposition, but to which the electrodeposited metal will not adhere so firmly as to prevent the removal of it without injury to the master record, or to the electro-deposited metal.

If so desired, the metallic surface 7 of the matrix shown in Fig. 4, may be subjected to the action of silver nitrate or a tincture of iodine, or may be washed in gasoline or given a very thin film of beeswax dissolved in benzine or gasoline. Any such of the various ways may be employed for preventing metal electrodeposited thereon from adhering so closely or intimately to the surface upon which it is deposited as to make it impossible to readily strip the same.

Figure 5:
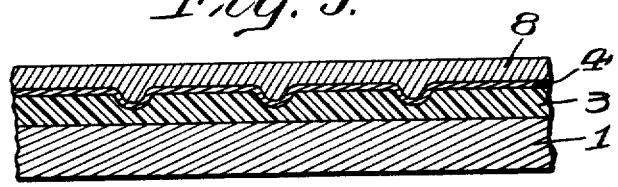
Figure 6:
Figure 7:

In Fig. 5, is shown the master record provided with an electroplate 8 upon the recorded surface thereof. After a sufficient thickness of electroplate metal has been built up on the recorded surface of the master record, the whole is removed from the electroplating bath and the electroplate shell 8 is stripped from the master record and provided with a suitable stiff backing 9 as shown in Fig. 6. This forms the original or master matrix having a continuous generally spiral ridge 10, containing the undulations corresponding to sound waves, and from which commercial records 11, shown in Fig. 7 may be pressed in the ordinary and well known manner.

In connection with the above, it will be observed that the electrodeposit 8, as shown in Fig. 5, is formed in immediate contact with the recorded surface of the master record, and is substantially a perfect negative of the recorded surface.

In carrying out the process above described a sapphire stylus having a smooth highly polished ball-shaped, or rounded, or elliptical, or spherical or semi-spherical surface at the end thereof, is preferably used, (see Fig. 14). The form of the recording end of the stylus is preferably that of a surface of revolution. The action of the recording end of the stylus upon the highly polished surface 7 of the thin skin or layer 4 is a smoothing, indenting action, as distinguished from a cutting or scraping action, and a groove having very smooth bottom and side walls is formed. Moreover, the width of the record groove transverse to a given point in the median line thereof will be uniform throughout the length of the record groove. A comparison of the groove made in the manner above indicated and that produced by the ordinary cutting or engraving process will be again referred to below, and is shown diagrammatically and on a greatly exaggerated scale in Figs. 17 and 18 of the drawings.

The preferred process of carrying out the invention above described is indicated diagrammatically, but in greater detail, in Figs. 8 to 16 and 19 to 22 inclusive. In order to make a master record having the qualities, characteristics and construction indicated in Fig. 4, a disc or plate 12 is preferably first provided with a highly polished surface 13, the said disc or plate 12 being, generally speaking, of a little greater diameter than that of the ultimate commercial record to be formed. This plate or disc 12 may be of wax or metal. If of wax or other material which is non-conductive of electricity, the surface 13 should be given a thin coating of powdered graphite or other comminuted conductive material; if of metal other than aluminum, the surface 13 should be treated as has been above indicated in connection with the electroplating of the master record shown in Fig. 4, so that an electroplate may be stripped therefrom; and if the disc 12 be of aluminum no special treatment other than the providing of the disc 12 with a smooth and highly polished surface 13 will be required. This disc 12 is then preferably given a thin film or layer of electroplating, and although the thickness of the deposit may vary, successful results have been obtained in actual practice with a deposit approximately one two-thousandths of an inch in thickness. The disc 12 provided with such electroplating 4 is diagrammatically illustrated in Fig. 9.

A disc 1 of celluloid of a diameter slightly larger than that of the disc 12, is then taken and a suitable solvent, such as amyl-acetate or acetone, or a mixture of amyl-acetate or acetone, or one or both, with an admixture of commercial celluloid cement is quickly flowed over one surface of the same, the solvent being allowed to remain in contact with the surface until the celluloid is softened to quite an appreciable distance or depth into the sheet. A very short time is actually required in practice, however, for the said solvents act rapidly upon the celluloid. The action of the solvent on the celluloid is to soften the celluloid of the surface of said sheet and to make that surface soft, mobile, plastic or semi-plastic, and thus substantially forms a layer 3 of soft material upon the base 1 of the sheet of celluloid, upon which the skin or electrodeposited metal 4 may be supported.

The next step in the process is to remove the thin film or sheet or skin of metal 4 from the polished surface 13 of the plate 12 and to transfer it to and support it upon the softened surface 3 of the celluloid. This should be accomplished in such a manner as to prevent any imperfect contact between the thin skin 4 and the softened celluloid 3, and to firmly unite the said skin to the surface of the celluloid. To do this, the solvent of celluloid may also be flowed over the electroplated surface of the plate shown in Fig. 9, and the edge of the softened face 3 of the sheet of celluloid, (as shown in Fig. 10), may then be brought against an edge of the electroplate 4. The sheet of celluloid may then be rolled down upon the electroplate, with a squeegee or similar roller 14, the action of which is to firmly press the softened face 3 against the metal sheet 4 and to express from between the softened surface of the celluloid and the sheet or electroplate 4 any surplus fluid and air bubbles, and to unite the two layers as is plainly indicated in Fig. 11. This pressing of the sheet of celluloid against the thin metallic skin or plate 4 causes the said electroplate 4 to adhere very firmly to the softened celluloid, particularly if the sheet be allowed to remain in contact therewith until the celluloid begins to set, or partially set, due to the absorption of the solvent. It is to be observed that by making the disc of celluloid 1 of a little larger diameter than the diameter of the plate 12, the edge of the celluloid sheet may be readily grasped for the purpose of stripping the electrodeposit or skin 4 from the plate 12. When the said edge of the sheet of celluloid is lifted and pulled away from the plate 12, the thin skin of electroplated metal 4 will adhere more firmly to the softened celluloid than it does to the plate 12, with the result that the said skin readily separates from the said plate 12 and sticks to the celluloid sheet. This forms the master record blank, comprising a sheet of celluloid having one surface thereof very soft and substantially compressible, upon which is supported a thin skin or layer of metal 4 with the polished surface 7 thereof outside. The master record blank is shown in Fig. 13 and the stripping of the celluloid and the skin 4 attached thereto from the plate 12 is diagrammatically shown in Fig. 12.

The succeeding steps of the process of this invention particularly relate to the forming of the original sound record groove in the master record. These steps are diagrammatically indicated in Figs. 15 and 16, in which is shown the turntable 15, rotatable in the direction indicated by the arrow thereon (Fig. 15), supporting and rotating the master record blank (as shown in Fig. 13) with the metallic skin or layer 4 supported upon the softened surface 3 of the celluloid 1 and with the end 16 of the stylus 17 of the recording sound box 18 resting on and forming an indented or impressed sound record groove 5 in the master record blank. If the right hand end of the master record blank shown in Fig. 16 be considered as the periphery thereof, the sound box is caused to traverse slowly across the face of the record blank during the recording in the manner indicated by the arrow on the recording sound box 18 shown in Fig. 16.

As has been above indicated, the stylus preferably used, is one in which the end 16 is very smooth and in the shape of a surface of revolution, as indicated in Fig. 14, the tip end 16 being preferably made of a sapphire or other suitable hard highly polished material. As shown in Fig. 16, this recording stylus bends or indents a sound record groove 5 in the thin metallic skin or layer 4, and substantially into the softened surface 3 of the sheet of celluloid, and the material underneath and at the sides of the stylus, instead of being displaced and pushed upwardly at the sides of the sound record groove, as might occur were it not for the thin layer of indentible, pliable or impressible material 4, and the compressible properties of the layer 3, is substantially compressed and condensed by the action of the stylus. No sharp corner will be formed where the side walls of the groove merge into the flat surface of the face 7 of the record blank, but the corner 6—6 will be rounded off as plainly indicated at 6 in Fig. 16.

Before forming the record groove in a master record blank by a recording stylus vibrated by sound waves, it is preferable to paint the metal face of the blank with soapy water, and to allow the soapy water to remain on the metallic surface of the blank during the forming therein of the record groove, in order to provide a lubricant for the stylus, and to assist in burnishing the surface of the groove. Before proceeding, however, to the next step of forming an electrodeposit on the metallic surface, as set forth below, the said metallic face should be thoroughly cleaned to remove the said lubricant.

When a cutting or engraving tool having a flat forward face is used to cut a sound record groove into a master record blank and vibrated laterally so as to form a groove of substantially even depth, the width of the sound record groove transverse to the median line of the groove at any particular point, may or may not be of the full width of the front face of the cutting stylus. Thus, in Fig. 17 is illustrated on an exaggerated scale, a sound record groove 5' formed by a cutting stylus, and in Fig. 18, is similarly shown a sound record groove 5, as formed by a recording stylus having its end or tip spherical or shaped in the form of any other suitable surface of revolution. It will be plain from an inspection of these two figures that the sound record groove illustrated in Fig. 17 varies constantly in width, measured along the lines 5$^a$ at right angles to the median line 5$^b$ thereof, while in Fig. 18, the groove is of constant width, when similarly measured in the direction of the lines 5$^a$ at right angles to the median line 5$^b$ thereof. In the type of groove shown in Fig. 17, the point of a reproducing stylus is liable to wedge between the narrow or restricted parts and ride upwardly on the side walls of the groove, instead of remaining in engagement with the bottom of the groove, thus causing excessive wear of the record and increasing the hissing and scratching noises during the reproduction of sound from the record. In a record having a groove of the form shown in Fig. 18, there is no crowding or jamming of the stylus, between the walls of the groove at these points where there are waves or undulations therein, and the engagement of the stylus at all times with the bottom of the groove is insured, with the result that a longer wearing of the record and more smooth and quiet reproduction of sound is attained.

The above described method of forming the record groove in the tablet by a stylus which does not substantially wear and which produces a groove of uniform width transverse to the median line thereof, makes it possible to effect a standardization of the grooves of various records, that is to say, it makes it possible to produce many different records the transverse shape of the grooves of which is identical. The same stylus can be used repeatedly in recording without exhibiting any substantial wear. A record groove of unchanging shape in cross-section, particularly throughout the length of the groove of the single record, is thus insured, and, in general, the grooves of all the records formed with the said stylus will be substantially identical.

After the master record illustrated in Fig. 19 has had the sound record groove 5 recorded therein as indicated in Fig. 16, the same may be allowed to stand until the softened surface sets or becomes again solid, thus forming the master record 19 shown in Fig. 19. In so doing, however, no cracks or gaps will be formed therein, nor will any uneven shrinkage occur.

The next step is to form the original master matrix therefrom. This is done preferably by forming an electroplate of the record bearing metal surface of the master record 19. In order to form on the recorded surface of the master record an electroplate which may be separated therefrom, the record bearing metal face may be treated either by oxidization or subjected to the action of a suitable solution or material as has been above referred to in connection with the treatment of the plate 12. The master record provided with an electroplate or shell 8 is indicated in Fig. 20. The electroplate 8 will completely cover the recorded face of the master record, filling the record groove 5 thereof and forming a projection or ridge 10 which will be a substantially perfect negative of the record groove in the original or master record. After a sufficient thickness of metal has been deposited upon the face of the master record, the electroplating process is stopped, the electroplate or shell 8 is stripped from the master record, and backed up with a suitable backing 9 as shown in Fig. 21, thus forming a die by means of which commercial records 11, having grooves 5 therein, the exact duplicates of the grooves in the original or master record, are formed, as shown in Fig. 22.

By reason of the fact that the record groove in the original or master record is very smooth and free from scratches and the master matrix is formed by depositing the shell directly upon the recorded surface of the master record, and, therefore, is similarly free from minute scratches or other irregularities, the commercial record is of a superior quality, the groove thereof being very smooth and free from scratches or marks of any kind. A smooth record groove in a master record materially prolongs the life of the commercial record, for during the reproduction of sound from a commercial record, the unevenness and irregularities in the record groove become exaggerated by the engagement of the reproducing stylus therewith, so that after a time the foreign noises due to the irregularities accentuated by the wear of the record, predominate over the pleasing quality of sound from the record. When the record groove, however, is free from irregularities and scratches, the wear of the record groove is much more uniform, and the record remains smooth for a much longer period of time, and is capable of being reproduced a very great number of times without wearing sufficiently to interfere with the reproduction of sound therefrom.

The above process may be modified in a number of ways to get different kinds of results. Thus, it has been observed that the stylus of a talking machine of a gramophone type may be more liable to jump out of the grooves during the reproduction of sound, at those points where the convolutions are of relatively smaller diameter than at that part of the record where the diameter of the convolutions is greater. It has been suggested in view of this fact, that the depth of the record groove near the center of a disc record might be made deeper than that part of the groove adjacent the periphery of the disc. This result may be readily obtained by our invention if the electrode position be controlled to make the electrodeposit or skin 4 thinner at the center than it is at the periphery, the increase in thickness being even and gradual from the center to the periphery. This kind of an electrodeposit shown in Fig. 25 may be formed in an electroplating bath, in any manner well known to those skilled in the art of electroplating. When, therefore, such a thin film or skin of metal 4' as is shown in Fig. 25 be substituted for the thin film or skin 4 of uniform thickness, such as is shown in Figs. 3 and 9, the stylus will depress or indent the groove into the skin progressively deeper as the recording stylus traverses the face of the master record blank, so formed, from the outer periphery toward the center. The master record so formed when having the record groove 5' deeper toward the center of the disc than it is adjacent the periphery, is illustrated in Fig. 23.

For some purposes it may be desirable to entirely remove the metal film or skin 4 after the celluloid or other material upon which the skin is supported has hardened or set throughout, thus leaving the master record entirely of celluloid or of such supporting material. To attain this end the skin of the master record shown in Figs. 4, 19 and 21 may be removed by subjecting the master record to the action of a suitable etching agent. A master record having the skin so removed is shown in Fig. 24.

In some instances it might be deemed desirable to use the metal skin 4 with the sound groove impressed therein, as the face of the die to be employed in pressing duplicates of the original master record. This may be effected by electrodepositing the metal 8 in such a manner on the face of the recorded skin 4 as to prevent the separation of the skin 4 and the backing 8. This may be effected by omitting that step in the process above described whereby the face of the skin is especially treated to prevent the firm adherence of the deposited metal thereto. Or a melted alloy, fusible at a relatively low temperature, say below 300 degrees Fahrenheit, may be poured over the face of the skin 4 of the master record shown in Fig. 19, and when allowed to cool, will be firmly united to the skin. The skin and backing together may then be separated from the support 1 in any suitable manner, as for example, by dissolving the support 1 in a suitable solvent, and the face of the die so formed will be thus provided with a record of sound in the form of a ridge, the reverse of the groove 5 from which records of the ordinary form may be pressed.

Figure 26:
Figure 27:
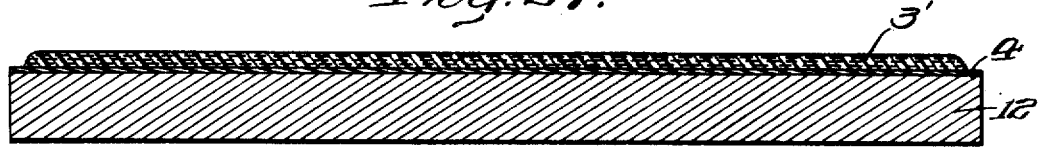
Figure 28:
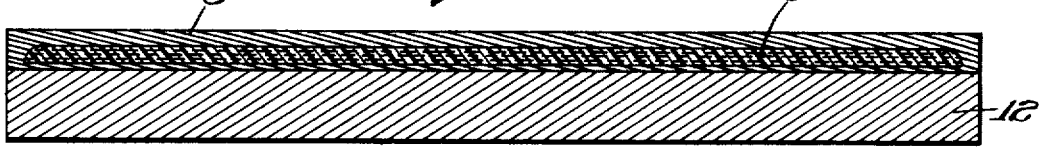
Figure 29:
Figure 30:
Figure 31:

In Figs. 26 to 30 is shown a modified form of master record blank embodying the invention above described. In Fig. 26 is shown the plate or support 12 having the highly polished surface 13 upon which has been electrodeposited the thin metallic skin or film 4. It is to be understood that, if necessary, the surface 13 has been previously treated to facilitate the removal of the electroplated metal 4 therefrom, as has been previously set forth. Upon the back of the metallic film or skin 4 is then deposited in any suitable manner a layer 3′ of liquid or semi-liquid celluloid or celluloid in solution, or other suitable material preferably by an air brush, or a suitable spraying mechanism, and after a sufficient thickness has been built up on the back of the plate or film of metal 4, and after the same has been allowed to solidify, or partially solidify or partially harden, the surface of the celluloid may be graphited, or otherwise made conductive, if necessary, and the whole again placed in the electroplating bath and the electrodeposition is continued. As a result of this, a relatively heavy backing 9′ of electrodeposited metal, unitary at the edges with the thin film or sheet 4, may be formed, completely encasing the liquid or semi-liquid or semi-solid celluloid 3′ or other suitable material. This forms a master record blank such as is shown in Fig. 29, which when separated from the plate 12, comprises a thin skin or shell 4, a unitary electroplated backing 9′ and a layer of liquid or semi-liquid or semi-plastic celluloid completely encased between the thin metal facing 4 and the backing 9′. If preferred the backing 9′ may consist of another layer or coating of celluloid or other material instead of electro-deposited metal.

The layer 3′ of celluloid or other soft material may be made so thin that when the stylus of the recording mechanism rests upon the metal skin 4, the metal is bent or indented or impressed so deeply that it substantially touches the backing 9′ at the point underneath the stylus in which case the stylus is virtually supported by the backing 9′, (see Fig. 30), thus insuring the formation of a groove of absolutely uniform depth throughout the length of the master record. If, however, it is so desired, the layer 3′ of soft material may be made so deep or the skin sufficiently thick or stiff to prevent the indented or depressed layer of thin metal from touching the backing, but in this case also the material forming the layer 3′ may be substantially compressed directly beneath and at the sides of the stylus. (See Fig. 31.)

A master record blank made in the manner above described, and as shown in Figs. 26 to 29 of the drawings, has this advantage— that the soft plastic or compressible material encased or enclosed between the skin 4 and the backing 9′ will remain indefinitely in that condition and therefore it is not necessary to use the same for the purpose of recording the sound therein immediately after making the tablet. Such tablets may be made and kept in stock until required for recording purposes.

Figure 32:
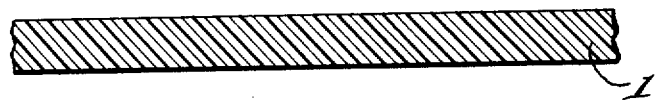
Figure 33:
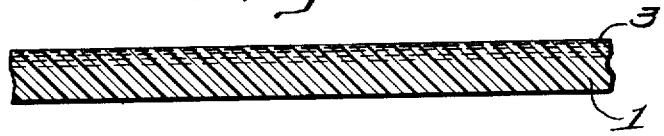

In Figs. 32 to 36 is indicated a further modification of the process above described. in which the original record may be formed by placing the recording stylus directly on the soft material without first covering the said soft material with a thin film or layer of pliable impressible material. If it were attempted to record a stylus 17, immediately and directly in the softened face 3 of a sheet of celluloid such as is shown in Figs. 10 or 33, the softened celluloid might stick, clot and pile up on either side of the recording stylus in such a manner as to prevent the production of a smooth record groove. The surface of the softened celluloid might be sticky and tacky, and any irregularities in the surface of the celluloid before the solvent were flowed over it would become exaggerated in the softened celluloid. It has been found, however, that if a solvent of celluloid be applied to one face of a sheet of celluloid as shown in Fig. 32, thereby softening that side or portion 3 of the celluloid as indicated in Fig. 33, and then a polished plate 4″ of metal or glass or similar material be applied to the softened face of the celluloid, (Fig. 34), and the same be allowed to stand for some time, so that the air does not have access to the softened face of celluloid. the solvent will be absorbed by the celluloid and the softened face will become substantially solid and dry but compressible. (See Fig. 35.) If, then, after the softened celluloid has changed to the condition above indicated, the plate of glass or metal be removed, a tablet 21 (Fig. 36) of celluloid will be produced which has a very smooth surface as smooth as the polished surface of the plate 4″, and in which a stylus will form an impression or indentation without producing any substantial displacement of the material thereof, or forcing of the same upwardly as ridges on the sides of the groove. The celluloid surface so formed will not adhere to the recording stylus, and the groove may thus be formed directly in the soft face of the celluloid without the interposition of a thin metallic or other skin. (See Fig. 37.)

From the above, it will be observed that in the process as particularly illustrated in Figs. 1 to 31, the master record is not injuriously affected by the making of a master matrix therefrom and the master record may be kept as the permanent master record from which further matrices may be made for the pressing of commercial records. The process above described further provides substantially two permanent records of sound, one the original or the master record, and the other the first or master matrix, either of which may be duplicated by electrodeposition in the manner above described without injury thereto. This constitutes a marked improvement over the usual processes in which, generally speaking, a master record can be safely used but once, and that time for the production of the original or first master matrix, which is usually kept and stored as the original record from which duplicates are subsequently made for pressing purposes.

It is further observed that the invention is particularly adapted for the production of an original master record in a compressible material; that is to say, in a material the volume of which may be reduced by the application of pressure thereto and which will remain in the condition in which it is so compressed; thus, when softened celluloid, or similar materials are used, the action of the recording stylus in engagement with the surface of the master record tablet is to progressively indent or impress a groove extending in a generally spiral direction on the face of the tablet, into the substantially compressible material, and the said material beneath and at the sides of the tip of the recording stylus is substantially compressed or condensed and reduced in volume and remains in that condensed condition, thus forming a tablet with a sound record groove permanently formed in the face thereof.

When, however, the soft or yielding material in which the original record is formed is too soft or is too fluid or too mobile for the particles displaced by the recording stylus to remain in the position in which they are displaced, the thin skin or sheet of indentible material, supported upon the top surface of the said mobile material, holds the displaced particles in the positions to which they are forced by the recording stylus. If the fluid or mobile or compressible material be encased in metal, or the air is otherwise prevented from coming into contact with the said material, it will remain substantially permanently in that condition. If, however, the said material be of such a character that the fluid contained therein evaporates or is absorbed by the supporting base or adjacent material, the tablet, after a suitable length of time, will become permanently solid throughout.

It is also to be observed that when a thin layer of metal or other material is supported upon the surface of the celluloid or other yielding material, the metal should be so thin and pliable as to offer very little resistance to the free vibration of the recording stylus. It should be indentible, pliable and impressible, and by impressible is meant that the material, having been given an indentation, remains permanently in the indented condition, after the indenting agent is no longer in engagement therewith.

Figure 34:
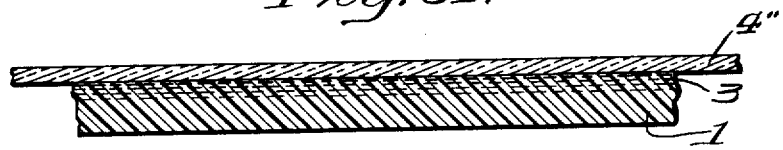
Figure 35:
Figure 36:
Figure 37:

It is to be further observed that whether the softened celluloid be covered with a thin layer 4 of indentible, impressible material into and through which the record groove is formed, or with a thicker plate of glass or other material 4'', as is indicated particularly in Figs. 34 and 35, the covering is a covering impervious to air, and that one purpose or function of the same is to prepare or treat the celluloid so as to prevent it from piling up or forming a ridge on either side of the groove while being formed by the recording stylus, and to prevent the celluloid from sticking to the recording stylus, and to permit the softened celluloid to take an impression progressively formed by a recording stylus by the substantial compression of softened celluloid.

While our invention is not to be construed as limited to the use of any particular solvent of celluloid, it has been found that acetone and amyl-acetate alone or together, effect the necessary changes in the condition of the celluloid as has been above indicated to a highly satisfactory degree. Either one may be used alone, or both of the said solvents may be used in securing the skin of metal to the celluloid and stripping it from the polished surface on which it is formed. Acetone works more quickly on celluloid than does amyl-acetate and in carrying out our invention, the acetone may be flowed over the electrodeposited metal and the amyl-acetate over the celluloid. The softened side of the sheet of celluloid is then firmly rolled down upon the electrodeposited skin or sheet of metal, over which is a film or layer of acetone, air bubbles are expressed by the use of a roller, as has been above indicated, and shown in Fig. 11, and a perfect contact engagement or union of the two layers is obtained. When the solvents are used in the manner above indicated, the amyl-acetate appears to effect the first or preliminary softening of the side of the sheet of celluloid which is to be placed against the electrodeposited metal, and when pressed down upon the same, wet with acetone, the acetone quickly completes the softening of the surface of the celluloid, and a perfect contact of the surfaces is effected. It has been ascertained, however, that a solvent composed of substantially equal parts of amyl-acetate and acetone, mixed with commercial celluloid cement (20%), and flowed over the electroplate and the celluloid sheet just prior to pressing them together, is very well adapted to the process of this invention.

It is further understood that the metallic skin or layer may be formed in any other way than by electrodeposition, although the manner of forming the skin as above set forth is the preferred way of forming it, and constitutes a simple and convenient way of forming an exceedingly thin uniform layer or sheet of material with a smooth plane highly polished surface.

The thickness of the sheet or skin formed by electrodeposition can be easily controlled and varied when required. Although the record groove is preferably formed in the master record tablet by substantially compressing the soft or yielding material, the invention is not to be limited, except when so specifically claimed, to the forming of a sound record groove by substantial compression, as the invention is capable of, and is intended to be also used in connection with a tablet in which the skin or crust is supported upon a material which, though not compressible, is otherwise displaceable by the recording stylus, or which may be both compressible and displaceable.

It is to be observed that in carrying out this invention as has been previously set forth, no sharp edges or corners are formed at the intersection of the walls of the groove and the top surface of the sound record blank, particularly when the thin skin or crust or shell above referred to constitutes the surface in engagement with the recording stylus. These rounded corners are produced by the bending or drawing of the skin during the forming of the groove therein. The formation of rounded corners between the side walls of the groove and the top surface of the record is particularly desirable as a groove of that shape in cross section in a commercial sound record tablet withstands the wear of the reproducing stylus much better than does a groove in which the corners or edges are sharp.

As has been above referred to, a record blank made in accordance with the invention as above set forth, may be made to offer the least possible resistance to the free and unimpeded vibration of a recording stylus in forming a groove of substantially even depth and in which sound vibrations are recorded in the groove in the form of lateral indulations in the side walls of the groove. Whatever resistance the material may offer to this free vibration of the recording stylus, is, however, substantially absolutely uniform. The resistance offered by the tablet is constant, therefore the stylus in recording is subjected at all times to a substantially uniform stress.

Celluloid appears to have, perhaps to a greater extent than other materials hereinbefore specified, properties which make it particularly fitted or adapted to the said purpose. Ordinary celluloid in sheet form may be said to be in a compressed or condensed condition. When said celluloid is subjected to the action of a solvent of celluloid, that portion of the celluloid which is affected by the solvent appears to change in its molecular condition to a certain extent. It appears to swell and the molecules appear to be arranged less compactly; that is to say, the softened portion of the celluloid appears to be in an expanded molecular condition, and in this expanded condition it may be more or less condensed or compacted by pressure. It is this property of the celluloid which renders it capable of receiving the indentation of the recording stylus in the form of a groove, the material adjacent the walls of which appears to be compacted or compressed or condensed as distinguished from being merely displaced. After the solvent for the celluloid has been allowed to evaporate or become completely absorbed by the celluloid, as by aging or similar treatment, the expanded celluloid appears to substantially reassume its original solid or compact condition, but without losing or substantially changing the form, shape or size of the grooves impressed therein by the recording stylus. In so far as can be at present observed by applicants, or so far as they are at present advised, the above principle appears to be in accordance with the results obtained, for in making a master record by an indenting stylus in the manner heretofore described, the material which receives the sound record groove does not appear to be merely displaced. It is not piled up in a ridge on either side of the groove as it would be expected to do if the material were merely displaced, but that material in engagement with the recording stylus or affected by the recording stylus, appears to be condensed and compacted.

While the above theory appears to harmonize and accord with the results attained by the practice of this invention, applicants disclaim any intention of limiting themselves to any exact physical or chemical theory of operation so long as the said results herein set forth are attained by the practice of the steps of the process with the use or employment of the materials, or the equivalent thereof. They reserve to themselves the rights to the practice of the process herein set forth whether or not the changes and results are due to the reasons, set forth herein, or are due to other reasons at present not known to applicants.

The action of the tip of the recording stylus upon the record blank formed in any of the ways indicated and set forth in the above specification is not that of scratching, scraping or cutting, but rather that of smoothly indenting, because the end of the stylus is rounded and smooth. The said end of the stylus smoothly and evenly presses down and indents into the recordable surface of the master record blank, a groove having the side and bottom walls thereof very smooth and substantially entirely free from scratches, breaks, gaps, or similar interruptions.

Since as the master record formed in accordance with the above process is characterized by a sound record groove in which there are no sharp edges between the side walls of the groove and the unrecorded surface of the tablet between the grooves, it follows that the die or master matrix made from said master record will have similarly rounded corners between the side walls of the sound record ridge and the surface adjacent said ridge.

Although the invention of this application has been described and explained by referring to specific material and specific steps performed in the carrying out of the process and in the making of the master sound record, die or matrix, and duplicates thereof, for the purpose of disclosing the invention, the invention is not to be construed as being limited to the exact steps or the exact materials mentioned, unless so specified in the claims, as other materials having like or similar properties may be similarly employed and the steps of the process may be varied to some extent to adapt them to the same without departing from the spirit and scope of this invention.

Having thus described our invention, what we claim and desire to protect by Letters Patent of the United States is:

1. The method of making a record of sound which consists in providing a tablet with a face of impressible material, supporting a skin of indentible material thereon, and progressively forming a groove having undulations corresponding to sound waves, in said impressible material in and through said indentible material by a stylus vibrated laterally in accordance with sound waves.

2. The method of making a record of sound which consists in softening one face of a sheet of normally hard material, and supporting a skin of indentible material thereon to form a tablet, forming a groove having undulations corresponding to sound waves in said tablet by bringing a substantially unwearing tip of a recording stylus into engagement with said skin, rotating said tablet, causing a relative movement between said stylus and said tablet transverse to the direction of the rotation of said tablet, and vibrating said stylus by and in accordance with sound waves, said stylus bearing against the surface of said skin to form said groove in said skin and the softened face of said normally hard material thereunder.

3. The method of making a master record tablet which consists in changing a surface of a sheet of ordinary celluloid to a compressible celluloid, and compressing a sound record groove progressively in said compressible celluloid by a stylus of a sound recording mechanism.

4. The method of making a record tablet which consists in changing a surface of a sheet of ordinary celluloid to a compressible celluloid, and compressing the sound record groove in said compressible celluloid.

5. The method of recording sound waves, which consists in vibrating a stylus in contact with a thin layer of pliable material to form therein a groove of substantially uniform depth having undulations corresponding to sound waves in the side walls of said groove.

6. The method of recording sound waves, which consists in rotating a thin skin of pliable material supported upon a compressible material, and forming in said skin, by means of a recording stylus vibrated in a plane transverse to the direction of the rotational movement between said stylus and said skin, a groove of substantially uniform depth having undulations corresponding to sound waves in the side walls thereof.

7. The method of making a record of sound, which consists in rendering a medium mobile by a solvent, supporting a metal skin on the softened or mobile surface of said medium, and recording sound waves in said metal skin.

8. The method of forming a record of sound, which consists in providing a surface composed of a soft compressible material, supporting a thin skin of pliable material on said soft surface, bringing a recording stylus into engagement with said skin and causing a relative movement between said stylus and said material, and vibrating said stylus by and in accordance with sound waves whereby said stylus forms a sinuous sound record groove in said pliable material and draws said skin into said soft compressible material to produce a rounded corner or edge between the side walls of said groove and the unindented surface of said skin.

9. The method of making a master record tablet, which consists in flowing over a face of a sheet of material, a solvent of said material to soften said face of said material and securing to and supporting upon said softened surface a thin skin of indentible material, and compressing a sound record groove progressively into said softened material through said indentible material by a stylus of a sound recording mechanism.

In witness whereof, we have hereunto set our hands this 26th day of July, A. D., 1915.

JAMES W. OWEN.
ALBERTIS HEWITT.

Witnesses:
JOHN D. MYERS,
CHARLES F. WILLARD.

Certificate of Correction.

It is hereby certified that in Letters Patent No. 1,518,443, granted December 9, 1924, upon the application of James W. Owen, of Secane, Pennsylvania, and Albertis Hewitt, of Camden, New Jersey, for an improvement in "Sound Records and Processes of Making the Same," errors appear in the printed specification requiring correction as follows: Page 1, line 31, for the word "or" read *of;* page 7, lines 81 and 82, for the words "electrode position" read *electrodeposition;* page 8, line 91, after the word "record" insert the word *by;* and that the said Letters Patent should be read with these corrections therein that the same may conform to the record of the case in the Patent Office.

Signed and sealed this 27th day of January, A. D. 1925.

[SEAL.]

KARL FENNING,
*Acting Commissioner of Patents.*